US011910421B2

(12) United States Patent
Gross et al.

(10) Patent No.: US 11,910,421 B2
(45) Date of Patent: Feb. 20, 2024

(54) STEERING DATA AMONG SERVING CELLS IN CARRIER AGGREGATION (71) Applicant: Nokia Solutions and Networks Oy, Espoo (FI)

(72) Inventors: Jonathan Gross, Gilbert, AR (US); Richard Vetter, Succasunna, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 281 days.

(21) Appl. No.: 17/605,135

(22) PCT Filed: Apr. 17, 2020

(86) PCT No.: PCT/US2020/028735
§ 371 (c)(1),
(2) Date: Oct. 20, 2021

(87) PCT Pub. No.: WO2020/219352
PCT Pub. Date: Oct. 29, 2020

(65) Prior Publication Data
US 2022/0141851 A1 May 5, 2022

Related U.S. Application Data (60) Provisional application No. 62/838,586, filed on Apr. 25, 2019.

(51) Int. Cl.
*H04W 72/50* (2023.01)
*H04W 28/086* (2023.01)

(52) U.S. Cl.
CPC ..... *H04W 72/535* (2023.01); *H04W 28/0861* (2023.05)

(58) Field of Classification Search
CPC ............ H04W 72/535; H04W 28/0808; H04L 5/0044; H04L 5/0075; H04L 5/0098; H04L 5/001
See application file for complete search history.

(56) References Cited

U.S. PATENT DOCUMENTS

| 9,794,943 | B1 | 10/2017 | Oroskar et al. |
| 2012/0076039 | A1* | 3/2012 | Kwon ................. H04B 7/0634 370/252 |

(Continued)

FOREIGN PATENT DOCUMENTS

| CN | 102638872 A | 8/2012 |
| CN | 103037528 A | 4/2013 |

(Continued)

OTHER PUBLICATIONS

International Search Report and Written Opinion mailed in corresponding PCT/US2020/028735 dated Jun. 23, 2020, 12 pages.

(Continued)

*Primary Examiner* — Christine Ng
(74) *Attorney, Agent, or Firm* — Tong, Rea, Bentley & Kim, LLC (57) ABSTRACT

A base station that controls carrier aggregation for a user equipment (UE) includes a memory configured to store weight factors for serving cells that are aggregated to provide wireless connectivity to the UE. The weight factors are determined based on characteristics of the serving cells. In some cases, the weight factors are determined based on frequencies of carriers used by the serving cells to provide the wireless connectivity to the UE. The base station also includes a processor configured to determine, based on the weight factors and a total weight assigned to the UE, weights for transmitting data to the UE via the serving cells. The base station further includes a transceiver configured to transmit data to the UE via the serving cells at priorities that are determined based on the weights for the serving cells.

20 Claims, 8 Drawing Sheets

(56) References Cited

U.S. PATENT DOCUMENTS

| | | |
|---|---|---|
| 2013/0188564 A1 | 7/2013 | Yu et al. |
| 2015/0065152 A1 | 3/2015 | Sadek et al. |
| 2016/0044584 A1* | 2/2016 | Jung .................... H04W 48/14 |
| | | 370/330 |
| 2016/0142933 A1 | 5/2016 | Rastogi et al. |
| 2016/0143046 A1 | 5/2016 | Gupta et al. |
| 2016/0143047 A1* | 5/2016 | Karlsson ............. H04W 72/566 |
| | | 370/329 |
| 2017/0118677 A1 | 4/2017 | Axelsson et al. |
| 2017/0257807 A1* | 9/2017 | Zacharias ............. H04W 76/28 |
| 2018/0077615 A1* | 3/2018 | El-Najjar ........ H04W 36/00835 |
| 2018/0241510 A1* | 8/2018 | Shen ..................... H04L 5/0055 |

FOREIGN PATENT DOCUMENTS

| | | |
|---|---|---|
| CN | 105517155 A | 4/2016 |
| CN | 108353340 A | 7/2018 |

OTHER PUBLICATIONS

First Office Action, CN202080046498.9 (National Phase of PCT/US2020/028735), dated Aug. 3, 2023, 11 pages.

\* cited by examiner

STEERING DATA AMONG SERVING CELLS IN CARRIER AGGREGATION

CROSS-REFERENCE TO RELATED APPLICATIONS

This application claims the benefit of International Patent Application No. PCT/US2020/028735, filed on Apr. 17, 2020, which claims the benefit of U.S. Provisional Patent Application No. 62/838,586, filed on Apr. 25, 2019, each of which is hereby incorporated herein by reference in its entirety.

BACKGROUND

Wireless communication devices (or nodes) transmit or receive signals in licensed or unlicensed frequency bands, which may include Wi-Fi access points that operate according to IEEE 802.11 standards in the unlicensed spectrum or base stations that operate in the licensed spectrum according to standards such as Fourth Generation (4G) Long Term Evolution (LTE) and Fifth Generation New Radio (5G-NR) standards defined by the Third Generation Partnership Project (3GPP). Nodes can aggregate channels in the licensed spectrum with channels in the unlicensed spectrum to increase bandwidth over the air interface. Downlink data is then split across the multiple channels. For example, base stations (or eNBs or gNBs) that operate according to LTE and 5G-NR can implement supplementary downlink (SDL) channels in the unlicensed spectrum to provide additional bandwidth for downlink communications to user equipment (UE) that are also communicating with the base station using channels in a licensed frequency band. For example, the base station may operate according to the LTE-U SDL Coexistence Specifications v1.3 (2015), which is incorporated herein by reference in its entirety. The UE initially connects to a primary carrier (sometimes referred to as a Pcell) that is anchored in the licensed spectrum and carries the uplink packets and control information for both the uplink and the downlink. The secondary carrier (sometimes referred to as an Scell) conveys best effort (or non-guaranteed bit rate, non-GBR) downlink data. In some cases, base stations also support uplink communication in the unlicensed spectrum. Other base stations operate in the unlicensed frequency bands according to Licensed Assisted Access (LAA) standards. Some base stations operate solely in the unlicensed frequency bands without support in licensed frequency bands, e.g., according to emerging standards such as MuLTEFire. In addition, some base stations support carrier aggregation of LTE and 5G NR carriers using Non-Standalone (NSA) Dual Connectivity (DC), or E-UTRA NR Dual Connectivity (EN-DC). In the NSA dual connectivity mode, the UE may be simultaneously or concurrently connected to both 4G LTE and 5G NR.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, an apparatus is provided. Some embodiments of the apparatus include a memory configured to store weight factors for serving cells that are aggregated to provide wireless connectivity to a user equipment (UE). The weight factors are determined based on characteristics of the serving cells. Some embodiments of the apparatus also include a processor configured to determine, based on the weight factors and a total weight assigned to the UE, weights for transmitting data to the UE via the serving cells. Some embodiments of the apparatus further include a transceiver configured to transmit data to the UE via the serving cells at priorities that are determined based on the weights for the serving cells.

In some embodiments, the weight factors are determined based on frequencies of carriers used by the serving cells to provide the wireless connectivity to the UE.

In some embodiments, higher weight factors are assigned to serving cells having higher frequencies to steer the data towards the serving cells having the higher frequencies and lower weight factors are assigned to serving cells having lower frequencies to steer the data away from the serving cells having the lower frequencies.

In some embodiments, the weight factors are determined based on at least one of spectrum utilization of the serving cells, loading of the serving cells, bandwidth supported by the serving cells, and capabilities of the UE.

Some embodiments of the apparatus also include schedulers to schedule transmission of data from the serving cells towards the UE and each scheduler schedules transmission of data from a corresponding one of the serving cells.

In some embodiments, the processor is configured to provide the weights associated with the serving cells to the schedulers and the schedulers schedule transmission of the data from the serving cells based on the weights.

In some embodiments, the processor is configured to modify at least one of the weight factors and the weights while maintaining the total weight assigned to the UE to maintain scheduling fairness of the UE relative to other UEs in carrier aggregation or not in carrier aggregation.

In some embodiments, the processor is configured to modify at least one of the weight factors and the weights in response to at least one of the weights falling below a minimum value.

In some embodiments, the processor is configured to increase the at least one of the weights that falls below the minimum value up to the minimum value and the processor is configured to adjust at least one other weight that does not fall below the minimum value by an amount determined based on the increases in the at least one of the weights up to the minimum value.

In some embodiments, the processor is configured to modify the at least one of the weight factors and the weights in response to a change in a number of serving cells for a carrier aggregation status of the UE.

In some embodiments, the processor is configured to modify the at least one of the weight factors and the weights in response to at least one channel quality of at least one of the serving cells falling below a predetermined threshold.

In some embodiments, a method is provided that includes accessing weight factors for serving cells that are aggregated to provide wireless connectivity to a user equipment (UE). The weight factors are determined based on characteristics of the serving cells. The method also includes determining, based on the weight factors and a total weight assigned to the UE, weights for transmitting data to the UE via the serving cells. The method further includes transmitting data to the UE via the serving cells at priorities that are determined based on the weights for the serving cells.

Some embodiments of the method also include determining the weight factors based on frequencies of carriers used by the serving cells to provide the wireless connectivity to the UE.

In some embodiments, determining the weight factors includes assigning higher weight factors to serving cells having higher frequencies to steer the data towards the serving cells having the higher frequencies and assigning lower weight factors to serving cells having lower frequencies to steer the data away from the serving cells having the lower frequencies.

Some embodiments of the method also include determining the weight factors based on at least one of spectrum utilization of the serving cells, loading of the serving cells, bandwidth supported by the serving cells, and capabilities of the UE.

Some embodiments of the method also include scheduling transmission of data from the serving cells towards the UE, wherein transmission of data from each of the serving cells is scheduled using a different scheduler.

Some embodiments of the method also include providing the weights associated with the serving cells to the schedulers, and wherein the schedulers schedule transmission of the data from the serving cells based on the weights.

Some embodiments of the method also include modifying at least one of the weight factors and the weights while maintaining the total weight assigned to the UE to maintain scheduling fairness of the UE relative to other UEs in carrier aggregation or not in carrier aggregation.

In some embodiments, modifying the at least one of the weight factors in the weights includes modifying the at least one of the weight factors and the weights in response to at least one of the weights falling below a minimum value.

In some embodiments, modifying the at least one of the weight factors and the weights includes increasing the at least one of the weights that falls below the minimum value up to the minimum value.

In some embodiments, modifying the at least one of the weight factors and the weights includes adjusting at least one other weight that does not fall below the minimum value by an amount determined based on the increases in the at least one of the weights up to the minimum value.

In some embodiments, modifying the at least one of the weight factors and the weights includes modifying the at least one of the weight factors and the weights in response to a change in a number of serving cells for a carrier aggregation status of the UE.

In some embodiments, modifying the at least one of the weight factors and the weights includes modifying the at least one of the weight factors and the weights in response to at least one channel quality of at least one of the serving cells falling below a predetermined threshold.

In some embodiments, an apparatus is provided. The apparatus includes at least one processor and at least one memory including computer program code. The at least one memory and the computer program code are configured to, with the at least one processor, cause the apparatus at least to perform determining weight factors for serving cells that are aggregated to provide wireless connectivity to a user equipment (UE) based on characteristics of the serving cells. The weight factors are used to determine weights for scheduling data transmission to the UE via the serving cells. The at least one memory and the computer program code are also configured to, with the at least one processor, cause the apparatus at least to perform storing the weight factors.

In some embodiments, determining the weight factors includes determining the weight factors based on frequencies of carriers used by the serving cells to provide the wireless connectivity to the UE.

In some embodiments, determining the weight factors includes assigning higher weight factors to serving cells having higher frequencies to steer the data towards the serving cells having the higher frequencies and assigning lower weight factors to serving cells having lower frequencies to steer the data away from the serving cells having the lower frequencies.

In some embodiments, determining the weight factors includes determining the weight factors based on at least one of spectrum utilization of the serving cells, loading of the serving cells, bandwidth supported by the serving cells, and capabilities of the UE.

DETAILED DESCRIPTION

Carrier aggregated serving cells (e.g., the Pcell and one or more Scells that are aggregated to provide connectivity to a user equipment) typically provide coverage in different frequency bands and have different coverage areas. For example, lower frequency signals have higher propagation distances and so a serving cell that provides connectivity at a lower frequency is typically able to provide coverage over a larger area. Higher frequency signals have lower propagation distances and so a serving cell that provides connectivity at a higher frequency typically provides coverage over a smaller area. Lower frequency bands are therefore referred to as "high value" frequency bands in part because of their ability to provide coverage to more UE in a larger area. Higher frequency bands are referred to as "low value" frequency bands. In some cases, the lower frequency coverage bands provide a lower total bandwidth than the higher frequency coverage bands. Operators need to ensure that sufficient capacity is available in the lower frequency bands to support premium or higher reliability services such as voice over LTE (VoLTE). However, conventional carrier aggregation techniques do not allow the operator to steer traffic towards (or away from) particular frequency bands.

Base stations include schedulers for each of the carriers, e.g., one scheduler is used to schedule downlink data on the Pcell and one or more additional schedulers are used to schedule downlink data on the one or more aggregated Scells. In response to initiating carrier aggregation for a UE, the base station assigns a total allowed scheduler weight such as a total allowed non-GBR scheduler weight to the UE. The total allowed scheduler weight assigned to each UE within a given quality-of-service (QoS) class identifier (QCI) is generally fair (e.g., the same on average) between the UEs within the QCI for a given data radio bearer (DRB) in order to fairly divide the available bandwidth between the UEs within the QCI. The total scheduler weight assigned to a UE in carrier aggregation is dependent on the number of activated serving cells, e.g., the total scheduler weight increases as the number of activated serving cells increases. A conventional base station divides the total allowed scheduler weight for the UE equally across the serving cells so that the schedulers for the serving cells apply the same weight when scheduling data for the UE. The equal distribution of scheduler weights for a UE does not allow an operator to steer data selectively towards some serving cells and away from other serving cells. For example, the operator cannot use evenly distributed scheduler weights to steer traffic towards the high frequency, low value spectrum to reduce loading on the low-frequency, high value spectrum. Thus, the low-frequency high-value spectrum can become highly loaded relative to the underutilized high frequency, low value spectrum.

The increased loading in the low-frequency, high-value spectrum that results from the inability to steer traffic towards different serving cells increases interference between cells in this portion of the spectrum, which may result in degraded QoS for users of premium services in these cells. The UEs that are in carrier aggregation typically have longer data sessions (relative to non-carrier aggregation UEs) because carrier aggregation is generally triggered based on data demand. The higher data demand that triggers carrier aggregation indicates that the duration of the session required to transmit the data is likely to be longer than the duration of a lower data demand session that does not trigger carrier aggregation. Thus, the UEs in carrier aggregation may cause more interference than the non-carrier aggregated UEs with data sessions. The operator can reduce interference in the low-frequency, high-value coverage bands by limiting the number of simultaneous or concurrent active connections in these bands, but this technique leads to a higher connection blocking rate. Limiting concurrent active connections also steers more UEs to initiate connections on lower frequency coverage bands, which reduces the QoS for the UEs. Moreover, some UEs are not able to use the high frequency, low value spectrum, which exacerbates underutilization of the high frequency, low value spectrum. Furthermore, during active connections that split data across the serving cells, base stations steer some data to each activated serving cell with sufficiently good channel quality to generate the feedback that is used to estimate the serving cell's throughput capability. The base station determines the appropriate amount of data to send toward the serving cell based on the throughput capability that is estimated based on previously transmitted data. Thus, a deadlock scenario occurs if the base station does not transmit some data to a serving cell because the base station is unable to estimate the serving cells throughput, which causes the base station to stop transmitting data via the serving cell.

Although the scheduling weights for different UEs can vary depending on the QCI and the number of aggregated serving cells (e.g., Pcells and Scells), the aforementioned drawbacks occur in conventional carrier aggregation system because the conventional system does not allow UEs to be differentiated based on the values of the layers or spectrum associated with the serving cells for the UEs. Conventional systems also do not account for some UEs being configured with low or high value spectrum layers, nor do these systems allow deprioritization of UEs on the high-value spectrum layers (relative to other UEs) while increasing the scheduling priorities of these UEs on their low value spectrum layers. Conventional systems are therefore unable to ensure consistency of the throughput experience across UEs regardless of whether they have access to low value or high-value spectrum layers. Conventional systems also do not allow "pushing" traffic from the higher value spectrum to the lower value spectrum for UEs that are able to support communication in the lower value spectrum. The lack of scheduling flexibility in the conventional system therefore prevents operators from optimally allocating the resources of the low-frequency, high-value serving cells and the high frequency, low value serving cells.

FIGS. 1-8 disclose embodiments of techniques that support flexible distribution of data across aggregated serving cells using a base station that determines scheduler weights for transmitting data via serving cells based on characteristics of the serving cells. The serving cells are aggregated to transmit data towards a user equipment (UE), e.g., using best effort or non-guaranteed bit rate (non-GBR) downlink data transmission from the serving cells. The scheduler weights are provided to schedulers for the serving cells and the schedulers schedule data transmission towards the UE based on the corresponding scheduler weights. Some embodiments of the base station assign a total scheduler weight to the UE for transmission over the aggregated serving cells. Scheduler weight factors are determined for the serving cells based on the characteristics of the serving cells. In some embodiments, the scheduler weight factors are determined based on carrier frequencies of the serving cells. For example, higher scheduler weight factors are assigned to serving cells having higher frequencies to steer the downlink traffic towards the higher frequency (lower value) serving cells. Lower scheduler weight factors are assigned to serving cells having lower frequencies to steer the downlink traffic away from the lower frequency (higher value) serving cells.

The base station partitions the scheduler weights based on the scheduler weight factors, e.g., so that the scheduler weights are higher for schedulers in higher frequency serving cells and the scheduler weights are lower for schedulers in lower frequency serving cells without changing the total scheduler weight assigned to the UE. The schedulers schedule downlink data for transmission via the serving cells based on the scheduler weights. Consequently, the coordinated action of the schedulers in the serving cells preferentially steers UE downlink data towards the serving cells with higher scheduler weights and away from the serving cells with lower scheduling weights. In some embodiments, the base station consists of both an eNB and a gNB in an LTE/5G-NR dual connectivity Option 3 Non-Standalone (NSA) configuration. In that case, the base station determines scheduler weights for both LTE and 5G-NR component carriers (CCs), which can be either a Pcell or Scell.

In some embodiments, scheduler weights that fall below a minimum value are adjusted upward to the minimum value and corresponding adjustments are made to the other scheduler weights based on the total scheduler weight for the UE. The scheduler weight factors and scheduler weights are also modified in response to changes in the number of serving cells or carrier aggregation status of the UE. In some embodiments, the scheduler weight factors are adjusted if the channel quality for an activated serving cell falls below a predetermined threshold. With each adjustment in the scheduler weight factors and scheduler weights, the total scheduler weight assigned to the UE is maintained in order to maintain the operator's desired scheduling fairness of UEs in carrier aggregation relative to UEs that are not in carrier aggregation. For example, the total allowed scheduler weight can be proportional to the number of serving cells so that the scheduling priority for the UE remains the same on each serving cell if the number of serving cells changes. For another example, the total allowed scheduler weight can be fixed regardless of the number of serving cells so that the scheduling priority for the UE across the system remains constant.

Figure 1:
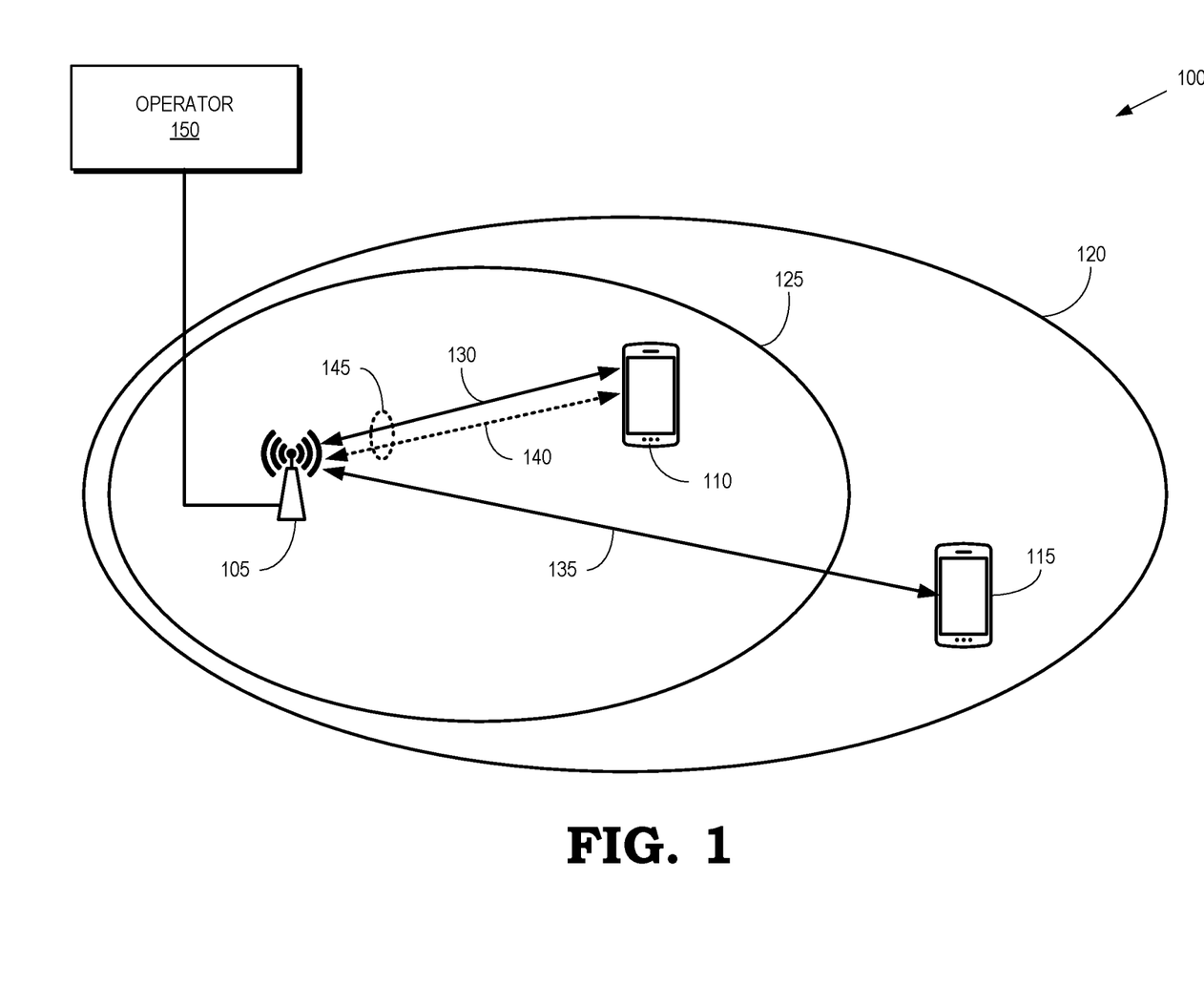
FIG. 1 is a block diagram of a wireless communication system that steers data transmission among serving cells based on characteristics of the serving cells according to some embodiments.

FIG. 1 is a block diagram of a wireless communication system 100 that steers data transmission among serving cells based on characteristics of the serving cells according to some embodiments. The wireless communication system 100 includes a base station 105 that provides wireless connectivity to one or more user equipment 110, 115. The base station 105 can also be referred to as a node, an eNodeB, an eNB, a cell, and the like. Although a single base station 105 is shown in FIG. 1, some embodiments of the wireless communication system 100 implement more than one base station to provide wireless connectivity in different geographic regions or on different carrier frequencies. Moreover, some embodiments of the base station 105 are connected to (and in control of) one or remote radio heads (not shown in FIG. 1) that provide wireless connectivity in different geographic regions at different carrier frequencies.

In the illustrated embodiment, the base station 105 provides wireless connectivity in a first (primary) cell 120 on a first carrier at a first frequency. The base station 105 also provides wireless connectivity in a second (secondary) cell 125 on a second carrier at a second frequency, which is a higher frequency than the first frequency. As discussed herein, lower frequency signals have higher propagation distances than higher frequency signals. The first cell 120 is therefore larger than the second cell 125, i.e., the first cell 120 covers a larger geographic area than the second cell 125. However, in some embodiments the geographic area covered by the first cell 120 is lower than the geographic area covered by the second cell 125, e.g., if beamforming is used to direct a narrow beam from the base station 105 in a preferred beam direction. The lower frequency bands that provide coverage within the first cell 120 are therefore referred to as "high value" frequency bands and the higher frequency bands that provide coverage within the second cell 125 are referred to as "low value" frequency bands. In some cases, the lower frequency coverage bands provide a lower total bandwidth than the higher frequency coverage bands. The first cell 120 and the second cell 125 are referred to herein as "serving cells."

In some embodiments, the lower frequency bands that provide coverage within the first cell 120 are licensed frequency bands that are licensed to an operator 150 and may only be used for wireless communication that is authorized by the operator 150. The base station 105 is therefore required to have a license to use the licensed frequency bands. In some embodiments, the higher frequency bands that provide coverage within the second cell 125 are unlicensed frequency bands. Unlicensed frequency bands are portions of the radiofrequency spectrum that do not require a license for use and may therefore be used by any device to transmit or receive radiofrequency signals. For example, the Unlicensed National Information Infrastructure (UNII) is formed of portions of the radio spectrum that include frequency bands in the range of 5.15 GHz to 5.825 GHz. For another example, the industrial, scientific, and medical (ISM) radio bands are portions of the radio spectrum that are reserved internationally for unlicensed communication. The ISM radio bands include bands with a center frequency of 2.4 GHz and a bandwidth of 100 MHz, a center frequency of 5.8 GHz and a bandwidth of 150 MHz, and a center frequency of 24.125 GHz and a bandwidth of 250 MHz, among other frequency bands.

The base station 105 establishes primary connections 130, 135 with the user equipment 110, 115 within the first cell 120 using the first carrier at the first frequency. In some embodiments, the first carrier (sometimes referred to as a Pcell) is anchored in the licensed spectrum and carries the uplink packets and control information for both the uplink and the downlink between the base station 105 and the user equipment 110, 115. The base station 105 also establishes a secondary connection 140 with the user equipment 110 within the second cell 125 using the second carrier at the second frequency. In some embodiments, the second carrier (sometimes referred to as an Scell) conveys best effort (or non-guaranteed bit rate, non-GBR) downlink data to the user equipment 110. The primary connection 130 and the secondary connection 140 are aggregated (as indicated by the loop 145) so that data intended for the user equipment 110 is selectively provided over the primary connection 130 or the secondary connection 140, thereby increasing the total bandwidth available for transmitting downlink data to the user equipment 110. The user equipment 115 is outside the second cell 125 and therefore unable to aggregate the primary carrier 135 with the secondary carrier in the second cell 125. Although a single second cell 125 is shown in FIG. 1, some embodiments of the base station 105 support additional secondary carriers in additional serving cells at other carrier frequencies, which can be aggregated with the primary carrier 130 and the secondary carrier 140. In some cases, user equipment (not shown) within the second cell 125 are also unable to aggregate the primary carrier 135 with one or more secondary carriers because the other user equipment do not support carrier aggregation, do not support communication in the second frequency band, or lack other capabilities.

The operator 150 in the wireless communication system 100 is responsible for ensuring that sufficient capacity is available in the lower frequency bands to support premium or higher reliability services such as voice over LTE (VoLTE). The operator 150 therefore configures the base station 105 to steer data selectively towards some serving cells and away from other serving cells based on characteristics of the serving cells 120, 125. In some embodiments, the operator 150 configures the base station 105 to steer data based on the frequencies of the carriers supported by the serving cells 120, 125. In other embodiments, the operator 150 configures the base station 105 based on other characteristics such as spectrum utilization at the serving cells 120, 125, loading of the serving cells 120, 125, bandwidth supported by the cells 120, 125, and the like. Steering of the data towards and away from the serving cells 120, 125 can also be performed based on capabilities of the user equipment 110, 115.

Some embodiments of the operator 150 configures the base station 105 to implement an unequal division of a total allowed scheduler weight, such as a total allowed non-GBR scheduler weight for the user equipment 110 that is in carrier aggregation. The total allowed scheduler weight is then distributed over the carriers supported by the first connection 130 and the aggregated second connection 140. The relative weighting of the first connection 130 and the second connection 140 is determined by preconfigured scheduler weight factors, which are determined by the operator 150 based on characteristics such as frequencies of the carriers in the first cell 120 and the second cell 125. The base station 105 determines scheduler weights for data transmitted over the connections 130, 140 to steer data preferentially towards one of the cells, such as the (lower value) second cell 125. Over time, serving cells in the lower value spectrum (such as the second cell 125) are scheduled to transmit a higher share of the data. In some cases, traffic steering as disclosed herein is used to reduce the loading caused by non-GBR traffic in the high value spectrum (e.g., in the first cell 120) and increases the utilization of the low value spectrum (e.g., in the second cell 125). Thus, a better quality of service, including reduced interference on high value spectrum, is experienced on premium services provided in the high value spectrum and better (more optimum) usage of both low and high value spectrum is achieved.

Some embodiments of the base station 105 adjust the scheduler weights in response to the base station 105 detecting that the user equipment 110 is experiencing poor signal quality on the first cell 120 or the second cell 125 in order to maintain a consistent end-user experience. Some embodiments of the base station 105 also attempt to ensure that the serving cells for the user equipment 110 (e.g., the first cell 120 and the second cell 125) are assigned no less than a predetermined minimum percentage of the total allowed non-GBR scheduler weight to avoid a deadlock scenario where no data is sent to a serving cell.

Figure 2:
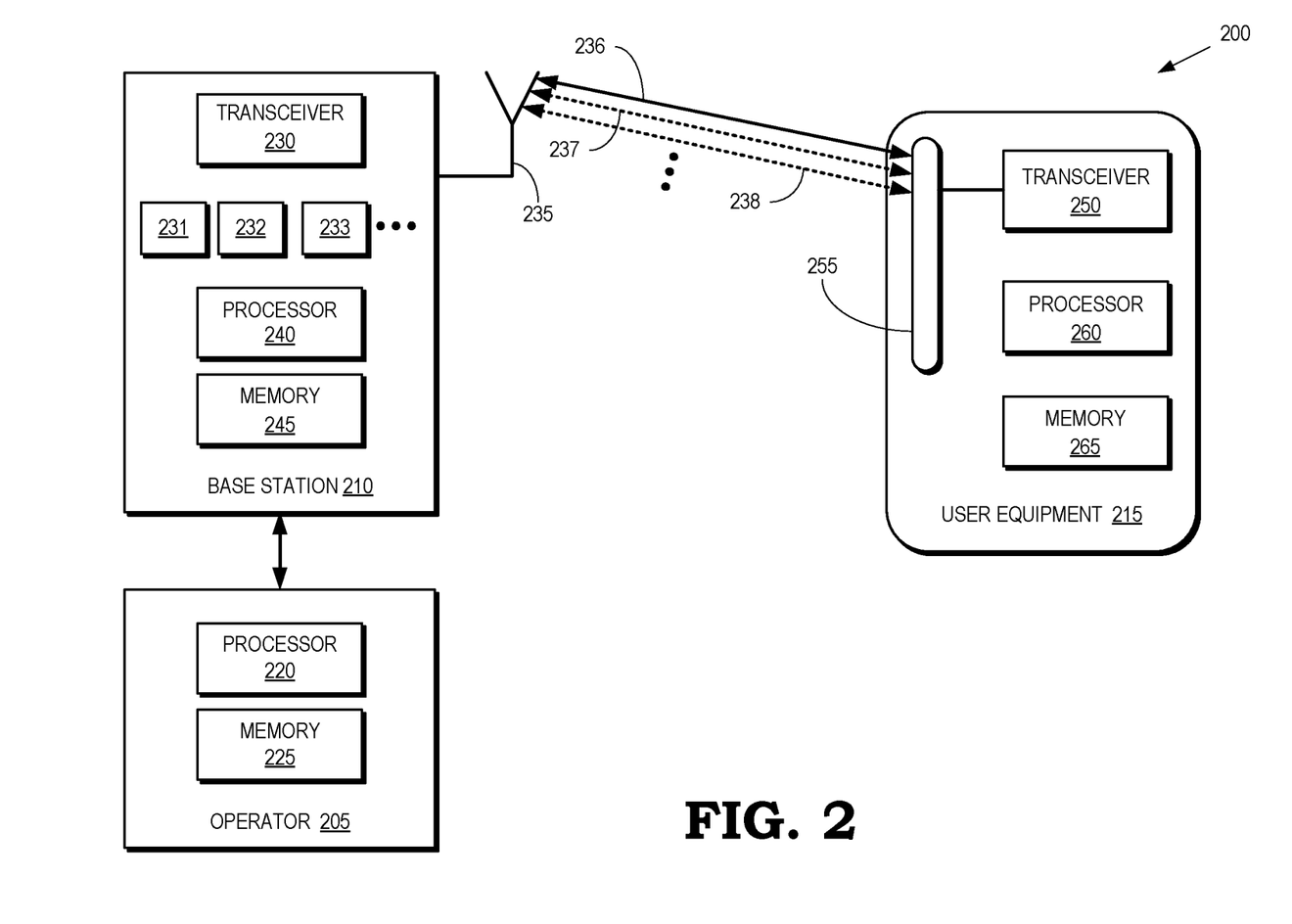
FIG. 2 is a block diagram of a wireless communication system that supports data steering among aggregated cells based on characteristics of the cells such as a carrier frequency according to some embodiments.

FIG. 2 is a block diagram of a wireless communication system 200 that supports data steering among aggregated cells based on characteristics of the cells such as a carrier frequency according to some embodiments. The communication system 200 includes an operator 205 that configures a base station 210 to aggregate a primary cell and one or more secondary cells for communication with user equipment 215. The communication system 200 is used to implement some embodiments of the wireless communication system 100 shown in FIG. 1.

The operator 205 includes a processor 220 and a memory 225. The processor 220 executes instructions stored in the memory 225 and stores information in the memory 225 such as the results of the executed instructions. Some embodiments of the processor 220 determine scheduler weight factors for cells that are aggregated for communication with the user equipment 215. Some embodiments of the processor 220 determine the scheduler weight factors for serving cells that are aggregated to provide wireless connectivity to the user equipment 215 based on characteristics of the serving cells. In some embodiments, the processor determines the scheduler weight factors based on the frequencies of the channels supported by the serving cells. For example, the processor 220 can assign higher weight factors to serving cells having higher frequencies to steer the data towards the serving cells having the higher frequencies and assign lower weight factors to serving cells having lower frequencies to steer the data away from the serving cells having the lower frequencies. In other embodiments, an operator or engineer configures the scheduler weight factors manually. The processor 220 stores information indicating the scheduler weight factors in the memory 225. The information is accessible to the base station 210, e.g., the scheduler weight factors can be pushed to the base station 210 for subsequent use or the base station 210 can pull the scheduler weight factors from the memory 225 when needed.

The base station 210 includes a transceiver 230 for transmitting and receiving signals over one or more connections or channels in an air interface via one or more antennas 235. In the illustrated embodiment, the transceiver 230 establishes a first connection 236 via a primary cell (such as the first cell 120 shown in FIG. 1) and one or more second connections 237, 238 via corresponding secondary cells (such as the second cell 125 shown in FIG. 1). As discussed herein, the primary cell is aggregated with one or more of the secondary cells. Schedulers 231, 232, 233 (collectively referred to herein as "the schedulers 231-233") are used to schedule transmissions (such as non-GBR downlink transmissions) over the aggregated connections 236-238, respectively. The schedulers 231-233 schedule the data transmissions based on weights that are determined for the serving cells based on the scheduler weight factors generated by the processor 220. The transceiver 230 may be implemented as a single integrated circuit (e.g., using a single ASIC or FPGA) or as a system-on-a-chip (SOC) that includes different modules for implementing the functionality of the transceiver 230.

The base station 210 also includes a processor 240 and a memory 245. The processor 240 executes instructions stored in the memory 245 and stores information in the memory 245 such as the results of the executed instructions. Although the schedulers 231-233 are depicted as separate entities in FIG. 2, some embodiments of the processor 240 instantiate the instances of the schedulers 231-233 in response to establishing the corresponding connections 236-238 via the serving cells.

The user equipment 215 includes a transceiver 250 for transmitting and receiving signals over the aggregated connections 236-238 via one or more antennas 255. The user equipment 215 also includes a processor 260 and a memory 265. The processor 260 executes instructions stored in the memory 265 and stores information in the memory 265 such as the results of the executed instructions. Some embodiments of the processor 260 combine the data received via the aggregated connections 236-238 and store the combined data in the memory 265.

Figure 3:
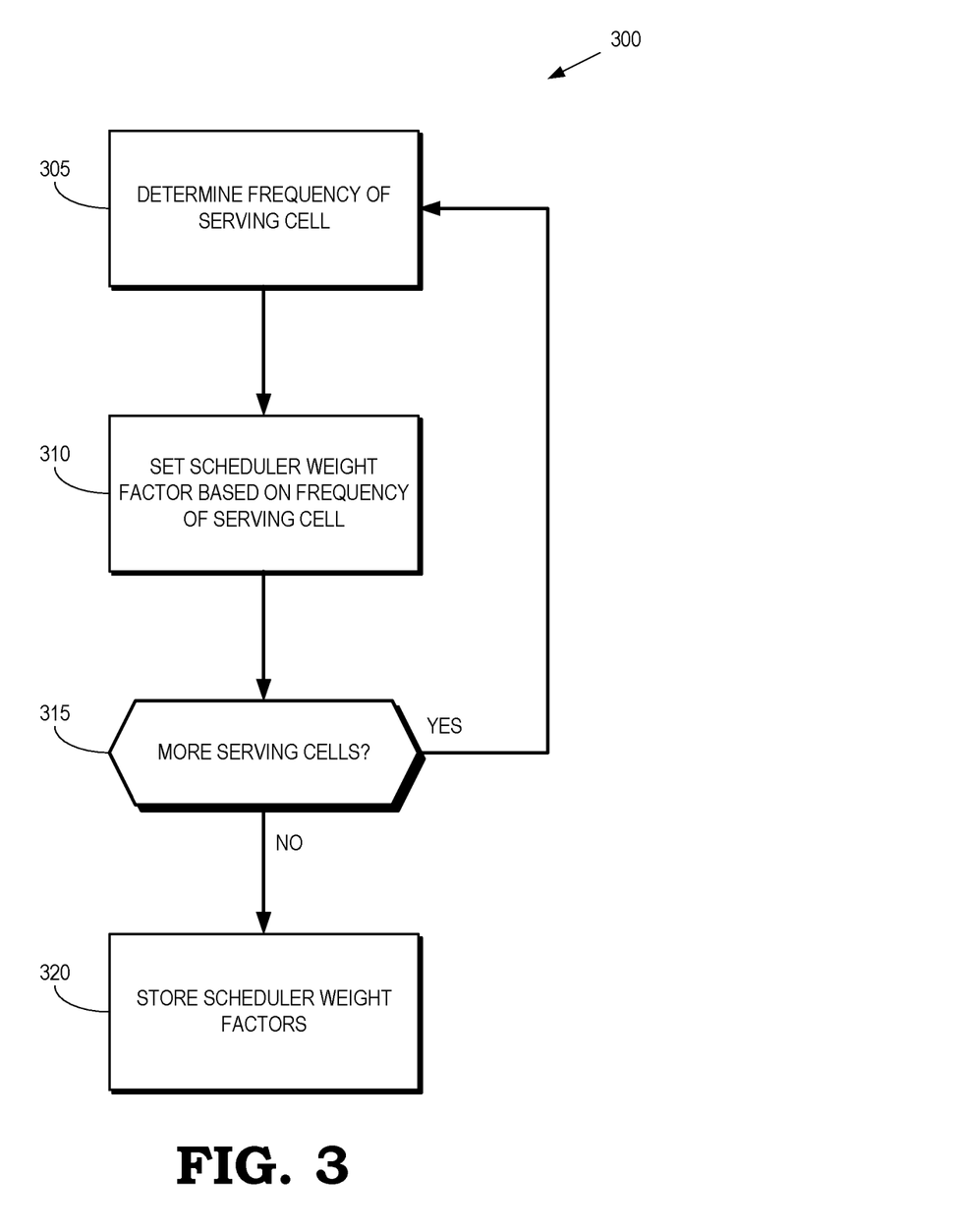
FIG. 3 is a flow diagram of a method of determining scheduler weight factors for serving cells based on characteristics of the serving cells according to some embodiments.

FIG. 3 is a flow diagram of a method 300 of determining scheduler weight factors for serving cells based on characteristics of the serving cells according to some embodiments. The method 300 is implemented in a processor such as the processors included in some embodiments of the operator 150 shown in FIG. 1 and the operator 205 shown in FIG. 2. Some embodiments of the method 300 are also implemented in base stations such as the base station 105 shown in FIG. 1 and the base station 210 shown in FIG. 2. The characteristic of the serving cell used to determine the scheduler weight factors in the method 300 is a frequency of a carrier used by the serving cell. However, other characteristics of the serving cells can also be used, as discussed herein.

At block 305, the processor determines a frequency of a serving cell. For example, the processor can determine a center frequency of a frequency band used by the carrier supported by the serving cell.

At block 310, the processor sets a scheduler weight factor for the serving cell based on the frequency of the serving cell. Some embodiments of the processor assign higher scheduler weight factors to serving cells having higher frequencies to steer the data towards the serving cells having the higher frequencies and assign lower scheduler weight factors to serving cells having lower frequencies to steer the data away from the serving cells having the lower frequencies. For example, the processor assigns a first (higher) scheduler weight factor to the serving cell if the frequency of the serving cell is above a frequency threshold and a second (lower) scheduler weight factor to the serving cell if the frequency of the serving cells below the frequency threshold. For another example, if a plurality of scheduler weight factors is associated with a corresponding plurality of frequency ranges, the processor assigns scheduler weight factors to the serving cell depending on which range includes the frequency of the serving cell. For yet another example, the processor can assign scheduler weight factors that are proportional to the frequency of the serving cells so that serving cells having higher frequencies are assigned higher scheduler weight factors and serving cells having lower frequencies are assigned lower scheduler weight factors.

At decision block 315, the processor determines whether there are more serving cells that have not been assigned scheduler weight factors. If so, the method 300 flows back to block 305. If not, and all of the serving cells have been assigned scheduler weight factors, the method 300 flows to block 320 and the processor stores the scheduler weight factors for subsequent use in determining scheduler weights for scheduling downlink transmissions via aggregated serving cells.

Figure 4:
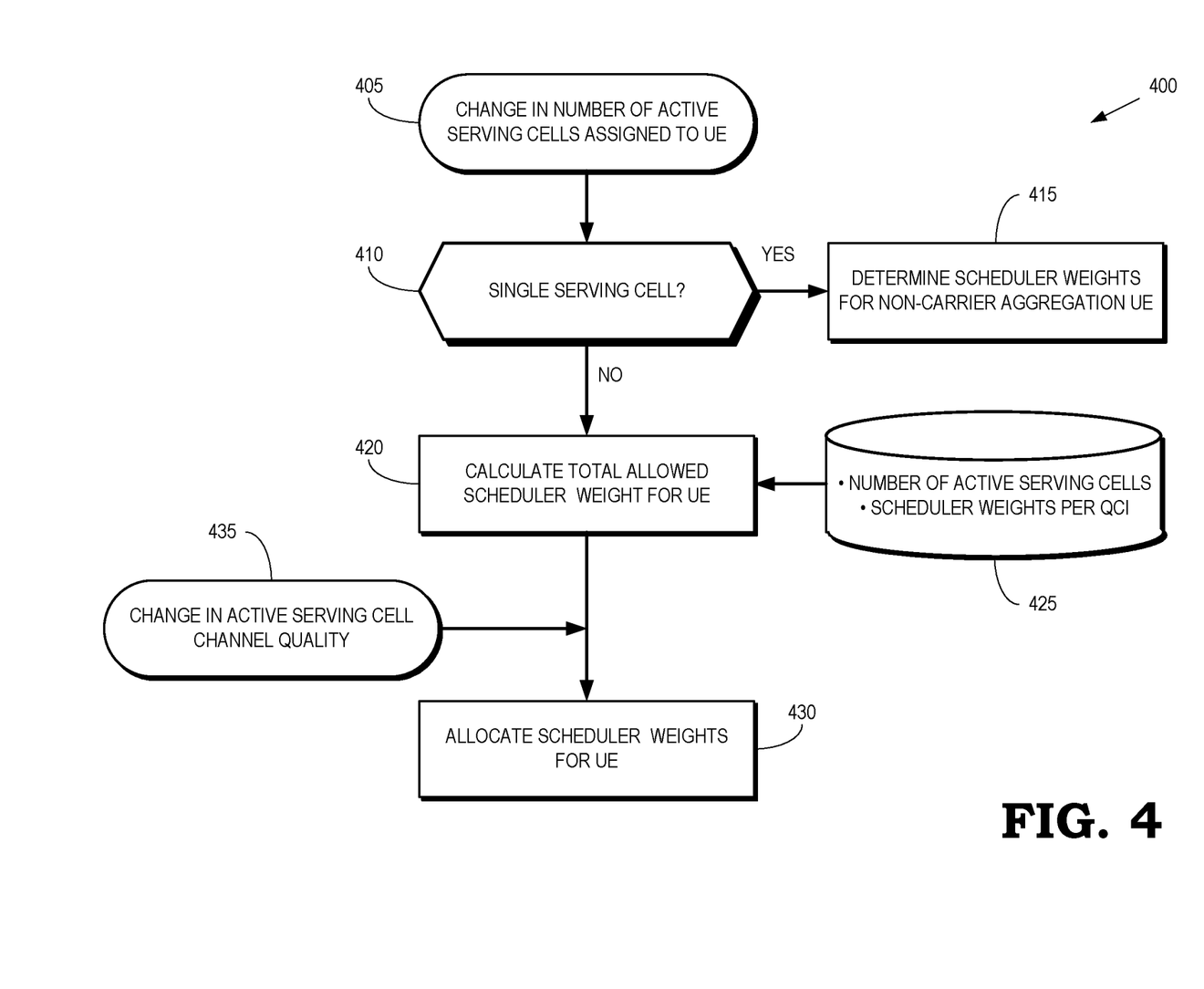
FIG. 4 is a flow diagram of a method of assigning scheduler weights to aggregated serving cells based on scheduler weight factors that are used to steer traffic towards (or away from) the serving cells according to some embodiments.

FIG. 4 is a flow diagram of a method 400 of assigning scheduler weights to aggregated serving cells based on scheduler weight factors that are used to steer traffic towards (or away from) the serving cells according to some embodiments. The scheduler weight factors are determined using some embodiments of the method 300 shown in FIG. 3. The method 400 is implemented in base stations such as the base station 105 shown in FIG. 1 and the base station 210 shown in FIG. 2. For example, the method 400 can be implemented in the processor 240 using information stored in the memory 245 of the base station 210 or acquired from the memory 225 in the operator 205 shown in FIG. 2.

At entry block 405, the base station detects a change in a number of active serving cells assigned to a user equipment. For example, if a primary cell and a secondary cell are initially aggregated and assigned for downlink transmission to the user equipment, the number of active serving cells changes in response to one or more additional secondary cells being aggregated with the original primary and secondary cells. Additional secondary cells are aggregated to provide additional bandwidth for transmitting larger amounts of data to the user equipment. For another example, if a primary cell and two secondary cells are initially aggregated and assigned for downlink transmission to the user equipment, the number of active serving cells changes in response to one of the secondary cells being removed from the active set of aggregated serving cells.

At decision block 410, the base station determines whether the user equipment is in carrier aggregation or non-carrier aggregation mode. In the illustrated embodiment, the base station determines whether the change in the number of active serving cells results in the user equipment being served by a single cell. If so, the user equipment is in non-carrier aggregation mode and the method 400 flows to block 415. If not, the user equipment is served by multiple cells in carrier aggregation mode and the method 400 flows to block 420.

At block 415, the base station determines a scheduler weight for the user equipment that is in the non-carrier aggregated mode. In the illustrated embodiment, the change in the number of active serving cells assigned to the user equipment to a single serving cell causes the user equipment to leave carrier aggregation. In that case, the configured scheduler weight factors are no longer factored into the scheduler weight assigned to the user equipment. This ensures that the user equipment is assigned the appropriate scheduler priority on its serving cell when the user equipment is not in carrier aggregation, which avoids the continuation of any de-prioritization that may have occurred on the primary cell while in the user equipment was in carrier aggregation. Some embodiments of the base station determine the scheduler weights for the non-carrier aggregation user equipment using the method 700 shown in FIG. 7.

At block 420, the base station calculates a total allowed scheduler weight for the user equipment. In some embodiments, the total allowed scheduler weight is a non-GBR scheduler weight. The total allowed scheduler weight is available to be partitioned or divided among the active serving cells that are aggregated to support communication with the user equipment. The base station accesses data 425 that is used to determine the total allowed scheduler weight, e.g., by accessing data 425 that is stored in the memory 245 of the base station 210 or the memory 225 of the operator 205 shown in FIG. 2. In the illustrated embodiment, the data 425 includes information indicating a number of active serving cells that are aggregated to support communication with the user equipment and information indicating bearer scheduler weights per QCI within the communication system. For example, the bearer scheduler weights can be non-GBR scheduler weights per QCI. The method 400 then flows to block 430.

At entry block 435, the base station detects a change in a channel quality of one of the active serving cells that is aggregated to support communication with the user equipment. In some embodiments, the base station detects the change by determining that a signal strength, a signal-to-interference-noise ratio (SINR), a block error rate, or other indication of channel quality has fallen below a corresponding threshold (e.g., in the case of a signal strength or an SINR) or risen above a corresponding threshold (e.g., in the case of a block error rate). Thus, each time the user equipment experiences a change in its number of serving cells, the base station recalculates scheduler weights such as the non-GBR scheduler weights based on the new set of assigned serving cells. If a serving cell that was assigned to the user equipment before the change is still assigned to the user equipment after the change, the scheduler weight assigned to the serving cell may change depending on the scheduler weight factors of the other assigned serving cells. In the illustrated embodiment, it is not necessary to recalculate the total allowed scheduler weight in the event of a change in channel quality of one of the active serving cells and so the method 400 flows from entry block 435 to block 430.

At block 430, the base station allocates scheduler weights to the active serving cells that are assigned to the user equipment. The scheduler weights are allocated based, at least in part, on scheduler weight factors that are determined for the active serving cells based on characteristics of the serving cells such as carrier frequencies.

Figure 5:
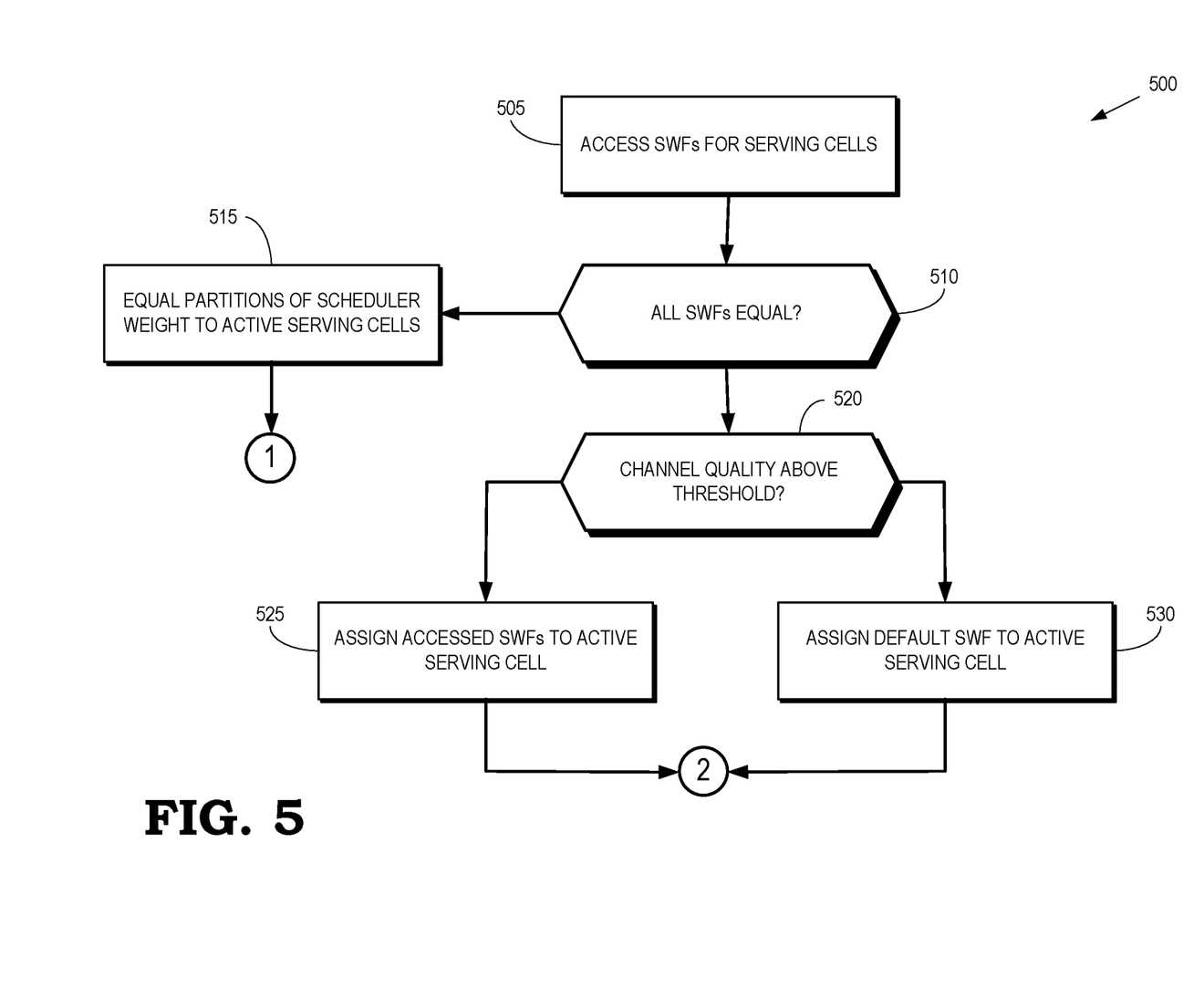
FIG. 5 is a flow diagram of a first portion of a method of allocating scheduler weights to active serving cells based on characteristics of the active serving cells according to some embodiments.

FIG. 5 is a flow diagram of a first portion 500 of a method of allocating scheduler weights to active serving cells based on characteristics of the active serving cells according to some embodiments. The first portion 500 of the method is implemented in base stations such as the base station 105 shown in FIG. 1 and the base station 210 shown in FIG. 2. For example, the first portion 500 of the method can be implemented in the processor 240 using information stored in the memory 245 of the base station 210 or acquired from the memory 225 in the operator 205 shown in FIG. 2. The first portion 500 of the method is used to implement some embodiments of the method 400 shown in FIG. 4, e.g., to allocate scheduler weights at block 430.

At block 505, the base station accesses scheduler weight factors for the active serving cells that are aggregated to provide connectivity to the user equipment. Some embodiments of the base station access the scheduler weight factors from the memory 245 of the base station 210 or the memory 225 of the operator 205 shown in FIG. 2.

At decision block 510, the base station determines whether all of the scheduler weight factors for the active serving cells are equal, i.e., each active serving cell has been assigned the same scheduler weight factor for the user equipment. If so, the first portion 500 of the method flows to block 515. If not, and at least one of the scheduler weight factors assigned to one of the active serving cells differs from another one of the scheduler weight factors assigned to another active serving cell, the first portion 500 of the method flows to decision block 520.

At block 515, the base station assigns equal partitions of scheduler weight to the active serving cells. In some embodiments, the base station assigns each of serving cell a scheduler weight that is equal to an average of the non-GBR scheduler weight, i.e., the total non-GBR scheduler weight divided by the number of active serving cells that are aggregated to support communication with the user equipment. The first portion 500 of the method then flows to the node 1.

At decision block 520, the base station determines whether channel qualities for the active serving cells are above a channel quality threshold. In some embodiments, the channel quality threshold corresponds to a channel quality that is sufficient to support a target throughput at a target error rate, although other criteria can be used to establish the channel quality threshold. The first portion 500 of the method flows to block 525 for the serving cells that have a channel quality above the channel quality threshold and the first portion 500 of the method flows to the block 530 for the serving cells that have a channel quality below the channel quality threshold.

At block 525, the base station assigns the scheduler weight factors to the corresponding serving cells that have a sufficiently high channel quality. At block 530, the base station assigns a default scheduler weight factor to serving cells that have a channel quality below the channel quality threshold. The default scheduler weight factor is set to a value that is lower than the scheduler weight factors that are determined based on characteristics of the serving cells, such as the carrier frequency. Consequently, the serving cells that have channel qualities below the channel quality threshold are de-prioritized relative to the serving cells that have channel qualities above the channel quality threshold. The first portion 500 of the method flows from the block 525, 530 to the node 2.

Figure 6:
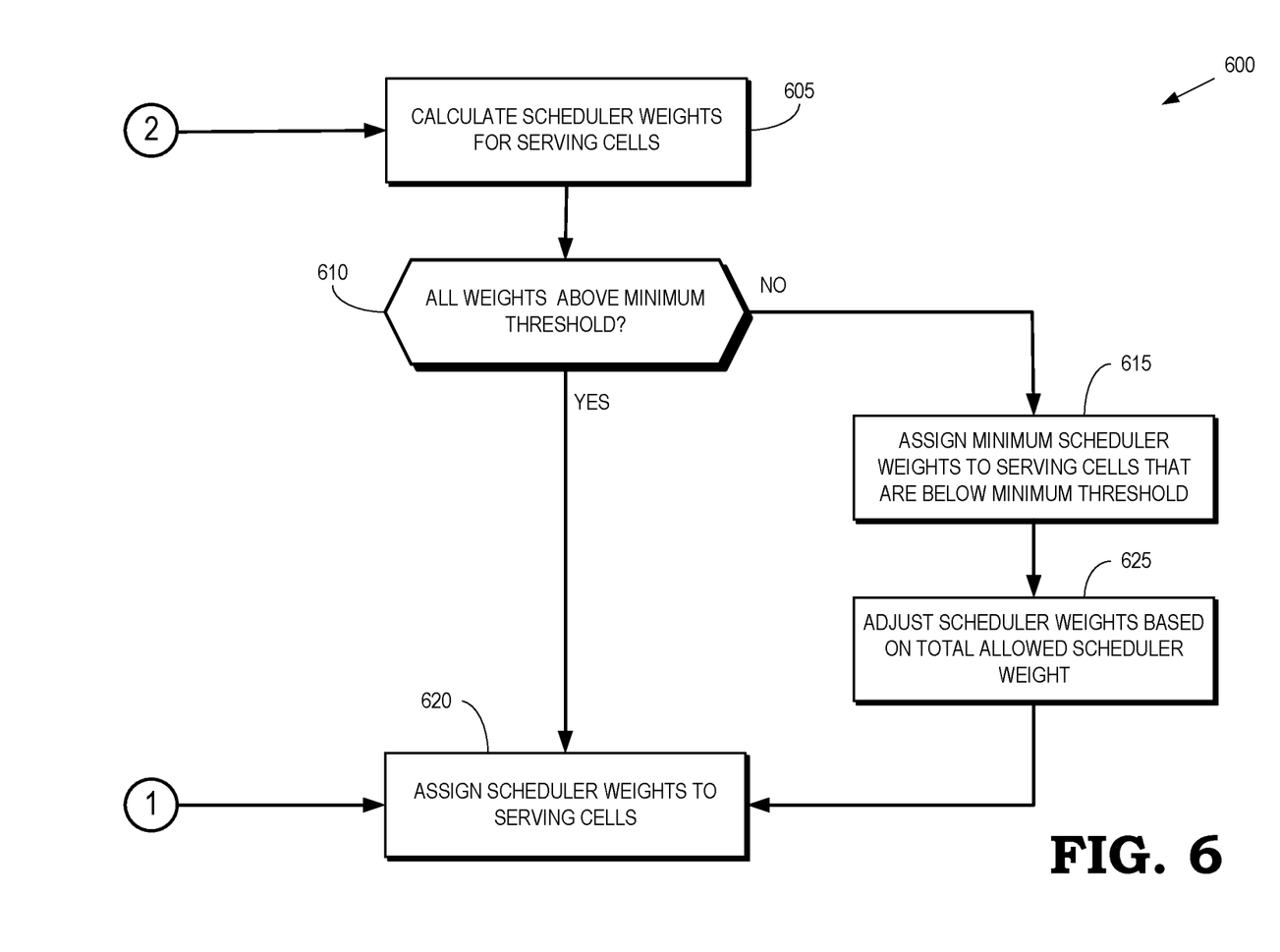
FIG. 6 is a flow diagram of a second portion of a method of allocating scheduler weights to active serving cells based on characteristics of the active serving cells according to some embodiments.

FIG. 6 is a flow diagram of a second portion 600 of a method of allocating scheduler weights to active serving cells based on characteristics of the active serving cells according to some embodiments. The second portion 600 of the method is implemented in conjunction with some embodiments of the first portion 500 shown in FIG. 5. The second portion 600 is implemented in base stations such as the base station 105 shown in FIG. 1 and the base station 210 shown in FIG. 2. For example, the second portion 600 can be implemented in the processor 240 using information stored in the memory 245 of the base station 210 or acquired from the memory 225 in the operator 205 shown in FIG. 2. The second portion 600 of the method is used to implement some embodiments of the method 400 shown in FIG. 4, e.g., to allocate scheduler weights at block 430.

A first entry point to the portion 600 is node 2, which flows into the block 605. Thus, some embodiments of the method flow from the blocks 525, 530 shown in FIG. 5 to the block 605. At block 605, the base station calculates scheduler weights for the serving cells. In some embodiments, the scheduler weight (W) for serving cell i is determined as:

$$W(i) = TW * \frac{SWF(i)}{\sum_i SWF(i)};$$

where SWF(i) is the scheduler weight factor for the serving cell i, the summation of SWF(i) is taken over all of the active serving cells, and TW is the total allowed non-GBR scheduler weight for the user equipment. As discussed herein, the scheduler weight factors are determined based on characteristics of the serving cells to steer data towards (and away from) serving cells having different characteristics, such as carrier frequencies. Thus, in some embodiments, the serving cells with the higher scheduler weight factors (prioritized serving cells) are assigned above average non-GBR scheduler weights, while serving cells with lower scheduler weight factors (deprioritized serving cells) are assigned below average non-GBR scheduler weights. The average of the non-GBR scheduler weights is across all user equipment associated with a serving cell for DRBs having a particular QCI. In some embodiments, the scheduler weight factors are configured such that user equipment in carrier aggregation have lower assigned non-GBR scheduler weights on the a primary cell then user equipment that are not in carrier aggregation on the primary cell and that have the same type(s) of non-GBR bearers as the carrier-aggregated user equipment.

At decision block 610, the base station determines whether the scheduler weights assigned to the serving cells are above a minimum threshold. In some embodiments, the ratio between the scheduler weight factors assigned to different serving cells associated with the user equipment can become very high, which can result in a deprioritized serving cell of the user equipment being assigned (at block 605) a non-GBR scheduler weight that is close to 0. If the non-GBR scheduler weight is too low, there is the danger of a deadlock scenario in which the base station stops assigning any data to the serving cell and therefore is unable to estimate the potential throughput of the deadlocked serving cell. To avoid a deadlock scenario, the second portion 600 of the method flows to block 615 if one or more of the scheduler weights is below the minimum threshold. Otherwise, if all of the scheduler weights are above the minimum threshold, the second portion 600 of the method flows to block 620.

At block 615, the base station assigns a minimum scheduler weight to the serving cells that have previously assigned to scheduler weights below the minimum threshold. At block 625, the base station adjusts scheduler weights for the serving cells based on the modified serving weights of the serving cells that previously had scheduler weights below the minimum threshold. In some embodiments, the base station adjusts the scheduler weights of the serving cells based on their distance from the minimum scheduler weight to ensure that the sum of the non-GBR scheduler weights across all the serving cells associated with the user equipment does not exceed the total allowed non-GBR scheduler weight for the user equipment. The second portion 600 of the method then flows to block 620.

A second entry point to the second portion 600 is node 1, which flows into the block 620. Thus, the method flows from block 515 in the first portion 500 of the method shown in FIG. 5 to the block 620 in the second portion 600 of the method.

At block 620, the base station assigns the scheduler weights to the serving cells.

Figure 7:
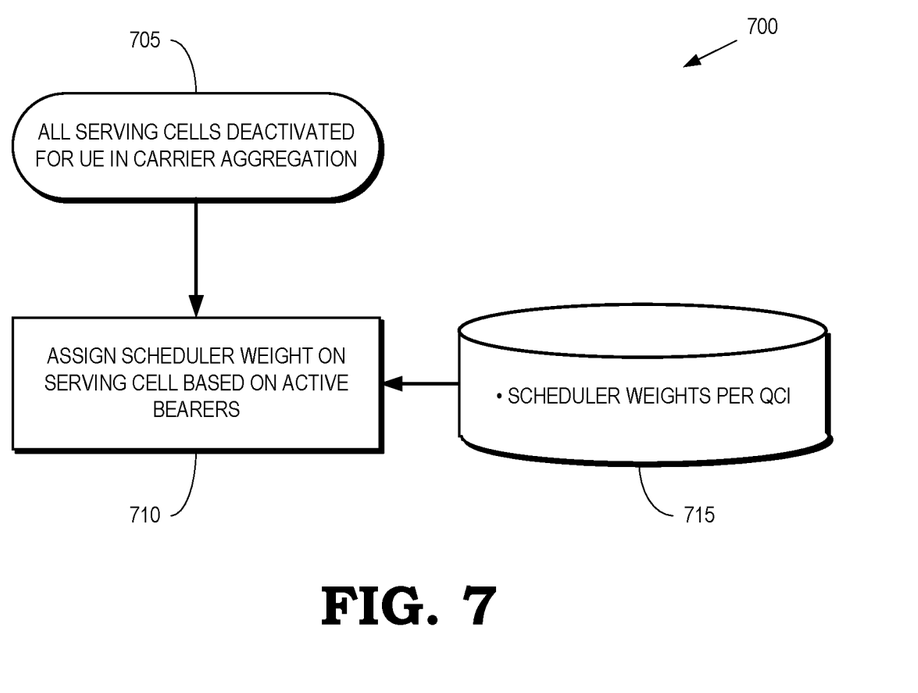
FIG. 7 is a flow diagram of a method of determining scheduler weights for user equipment that are not in carrier aggregation according to some embodiments.

FIG. 7 is a flow diagram of a method 700 of determining scheduler weights for user equipment that are not in carrier aggregation according to some embodiments. The method 700 is implemented in base stations such as the base station 105 shown in FIG. 1 and the base station 210 shown in FIG. 2. For example, the method 700 can be implemented in the processor 240 using information stored in the memory 245 of the base station 210 or acquired from the memory 225 in the operator 205 shown in FIG. 2.

At entry block 705, the base station deactivates aggregated serving cells for a user equipment in carrier aggregation. For example, if a user equipment that is receiving download data transmissions via a primary cell that is aggregated with a secondary cell, the secondary cell can be deactivated, which results in the user equipment being removed from the carrier aggregation mode.

At block 710, the base station assigns one or more scheduler weights to the active serving cell for the user equipment that is not in carrier aggregation. In the illustrated embodiment, the base station accesses data 715 including scheduler weights per QCI, such as non-GBR bearer scheduler weights. The base station then determines the scheduler weight for the active serving cell based on the data 715. For example, the base station can determine a non-GBR scheduler weight based on the scheduler weights per QCI indicated in the data 715.

Figure 8:
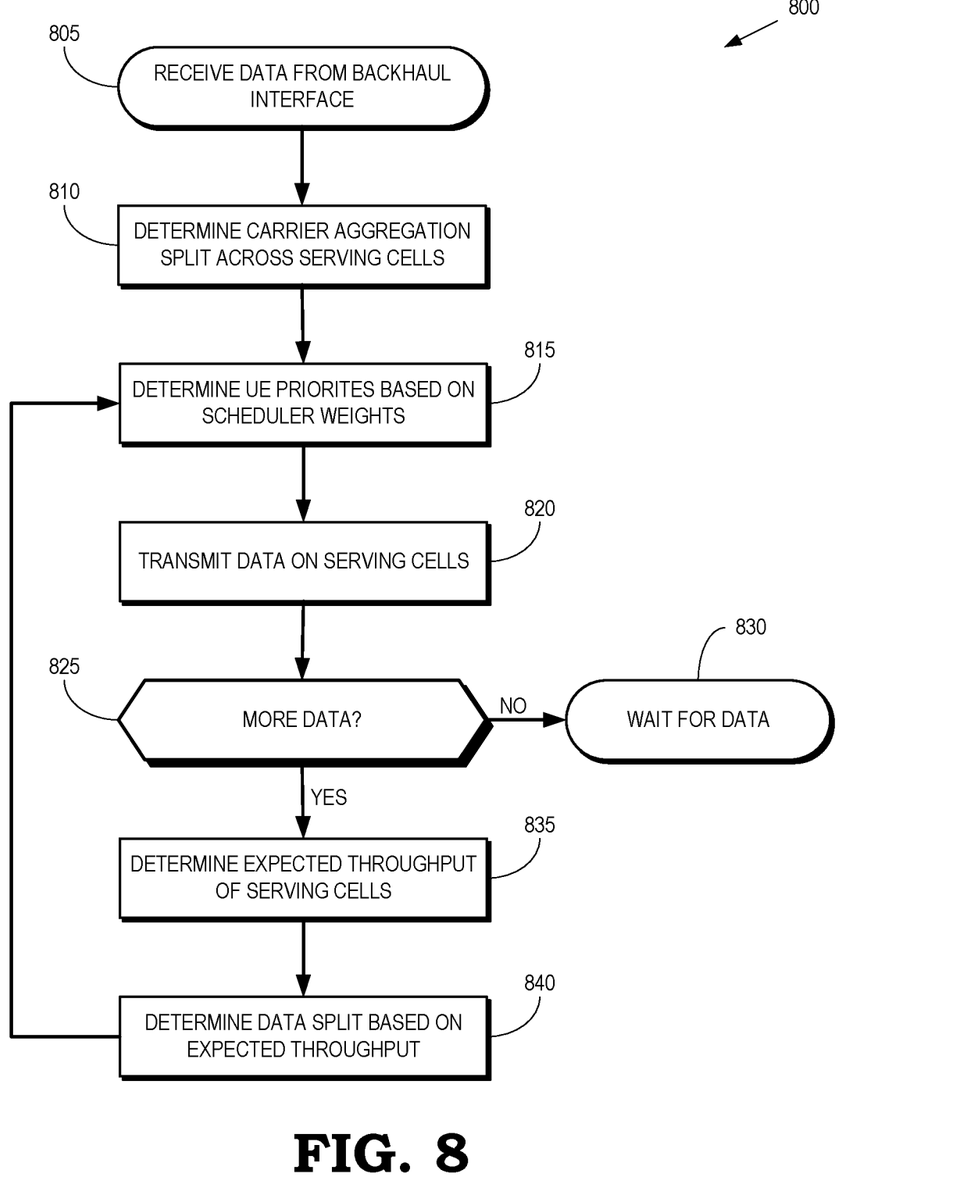
FIG. 8 is a flow diagram of a method of transmitting data via aggregated serving cells according to scheduler weights determined based on characteristics of the serving cells according to some embodiments.

FIG. 8 is a flow diagram of a method 800 of transmitting data via aggregated serving cells according to scheduler weights determined based on characteristics of the serving cells according to some embodiments. The method 800 is implemented in base stations such as the base station 105 shown in FIG. 1 and the base station 210 shown in FIG. 2. For example, the method 800 can be implemented in the processor 240 using information stored in the memory 245 of the base station 210 or acquired from the memory 225 in the operator 205 shown in FIG. 2.

At block 805, the base station receives data for downlink transmission from a backhaul interface. In the illustrated embodiment, the data is non-GBR (or best effort) data that is to be transmitted over the downlink to the user equipment. However, other types of data are received for transmission by the base station in some embodiments.

At block 810, the base station determines a carrier aggregation split of the data across the serving cells. In some embodiments, the amount of data allocated to a serving cell is based on the downlink throughput to the user equipment via the serving cell. As discussed herein, the downlink throughput is based upon previously transmitted data.

At block 815, the base station determines priorities for scheduling the user equipment for downlink transmission via the serving cells based on the scheduler weights. In some embodiments, the priorities are determined by schedulers for the serving cells, such as the schedulers 231-233 shown in FIG. 2. For example, the schedulers can prioritize data transmission to the user equipment based on the scheduler weights for the user equipment relative to scheduler weights assigned to other user equipment on the same serving cell. Higher priority is assigned to the user equipment having higher scheduler weights.

At block 820, the base station transmits the scheduled downlink data via the serving cells. For example, a transceiver such as the transceiver 230 shown in FIG. 2 can transmit the downlink data via the serving cells according to the schedules generated by the schedulers of the serving cells.

At decision block 825, the base station determines whether there is more data for transmission to the user equipment. If not, the method 800 flows to exit block 830 and the base station weights for more data to arrive via the backhaul interface. If there is additional data to be transmitted to the user equipment, the method 800 flows to block 835.

At block 835, the base station determines an expected throughput of the serving cells based on previously transmitted data. In some embodiments, the base station determines the expected throughput based on a recent average throughput via the serving cell. However, other criteria or techniques can be used to determine an expected throughput for the user equipment.

At block 840, the base station determines a data split across the serving cells in carrier aggregation based on the expected throughputs via the serving cells. The method 800 then flows back to block 815 and the schedulers determine priorities for transmitting the data to the user equipment based on the scheduler weights.

In some embodiments, the bandwidth available to a user equipment on a serving cell increases as the scheduling weight of the user equipment on the serving cell increases. Consequently, the throughput to the user equipment via the serving cell increases as its scheduling weight increases. More data is allocated to the user equipment on the serving cell in response to the throughput increasing. In some embodiments, the relative priorities of different user equipment that are contending for the same downlink resources are determined based on the scheduler weights of the user equipment on the serving cell. For example, if a first user equipment is contending for downlink resources with one or more second user equipment on a serving cell (e.g., the serving cell is in a loaded condition) and the serving cell has been deprioritized for the first user equipment such that the scheduler weight for the first user equipment is lower than the weight assigned to one or more second user equipment, the scheduler deprioritizes the first user equipment relative to the second user equipment. In that event, the first user equipment experiences lower downlink throughput on the serving cell and the base station is more likely to steer more data to the prioritized serving cells of the first user equipment. Likewise, if the first user equipment is contending for downlink resources with the second user equipment on a serving cell that has been prioritized for the first user equipment such that the scheduler weight for the first user equipment is higher than the weight assigned to the second user equipment, the first user equipment experiences higher throughput on the prioritized serving cells and the base station is more likely to steer less data to the deprioritized serving cells of the first user equipment.

Some embodiments of the techniques for steering data among serving cells for a user equipment in carrier aggregation have several advantages over the conventional practice. For example, steering traffic in carrier aggregation based on carrier frequencies supports biasing of traffic towards higher frequency, lower value spectrum for user equipment in carrier aggregation that are also able to use the higher frequency, lower value spectrum for secondary cells. Overall fairness is maintained between carrier aggregated and non-carrier aggregated user equipment in terms of the allocation of total spectrum assets (bandwidth) between carrier aggregated/non-carrier aggregated user equipment. For another example, traffic steering based on characteristics of the serving cells supports offloading of traffic from higher value spectrum to lower value spectrum for user equipment that are able to use lower value spectrum for secondary cells, thereby allowing high value spectrum to be used for critical traffic (e.g. guaranteed bit rate traffic) or by user equipment that do not have the capability to use lower value spectrum for their secondary cells. For yet another example, some embodiments of the traffic steering technique disclosed herein allow detection of poor radiofrequency channel conditions for user equipment that have secondary cells using low value spectrum. The amount of traffic carried on high value spectrum can be increased in response to detecting the poor radiofrequency channel conditions for the user equipment that have secondary cells on the low value spectrum secondary cells, thus maintaining consistent quality of service and fair allocation of total usage bandwidth between all user equipment.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
  a) hardware-only circuit implementations (such as implementations and only analog and/or digital circuitry) and
  b) combinations of hardware circuits and software, such as (as applicable):
    i. a combination of analog and/or digital hardware circuit(s) with software/firmware and
    ii. any portions of a hardware processor(s) with software (including digital signal processor(s), software, and memory(ies) that work together to cause an apparatus, such as a mobile phone or server, to perform various functions) and
  c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
    a memory configured to store weight factors for serving cells that are aggregated to provide wireless connectivity to a user equipment (UE), wherein the weight factors are determined based on characteristics of the serving cells;
    a processor configured to determine, based on the weight factors and a total weight assigned to the UE, weights for transmitting data to the UE via the serving cells; and
    a transceiver configured to transmit data to the UE via the serving cells at priorities that are determined based on the weights for the serving cells.

2. The apparatus of claim 1, wherein the weight factors are determined based on frequencies of carriers used by the serving cells to provide the wireless connectivity to the UE.

3. The apparatus of claim 2, wherein higher weight factors are assigned to serving cells having higher frequencies to steer the data towards the serving cells having the higher frequencies, and wherein lower weight factors are assigned to serving cells having lower frequencies to steer the data away from the serving cells having the lower frequencies.

4. The apparatus of claim 1, wherein the weight factors are determined based on at least one of spectrum utilization of the serving cells, loading of the serving cells, bandwidth supported by the serving cells, and capabilities of the UE.

5. The apparatus of claim 1, further comprising:
    schedulers to schedule transmission of data from the serving cells towards the UE, wherein each scheduler schedules transmission of data from a corresponding one of the serving cells.

6. The apparatus of claim 5, wherein the processor is configured to provide the weights associated with the serving cells to the schedulers, and wherein the schedulers schedule transmission of the data from the serving cells based on the weights.

7. The apparatus of claim 1, wherein the processor is configured to modify at least one of the weight factors and the weights while maintaining the total weight assigned to the UE to maintain scheduling fairness of the UE relative to other UEs in carrier aggregation or not in carrier aggregation.

8. The apparatus of claim 7, wherein the processor is configured to modify at least one of the weight factors and the weights in response to at least one of the weights falling below a minimum value.

9. The apparatus of claim 8, wherein the processor is configured to increase the at least one of the weights that falls below the minimum value up to the minimum value, and wherein the processor is configured to adjust at least one other weight that does not fall below the minimum value by an amount determined based on the increase in the at least one of the weights up to the minimum value.

10. The apparatus of claim 8, wherein the processor is configured to modify the at least one of the weight factors and the weights in response to a change in a number of serving cells for a carrier aggregation status of the UE.

11. The apparatus of claim 8, wherein the processor is configured to modify the at least one of the weight factors and the weights in response to at least one channel quality of at least one of the serving cells falling below a predetermined threshold.

12. A method comprising:
    accessing weight factors for serving cells that are aggregated to provide wireless connectivity to a user equipment (UE), wherein the weight factors are determined based on characteristics of the serving cells;
    determining, based on the weight factors and a total weight assigned to the UE, weights for transmitting data to the UE via the serving cells; and
    transmitting data to the UE via the serving cells at priorities that are determined based on the weights for the serving cells.

13. The method of claim 12, further comprising:
    determining the weight factors based on frequencies of carriers used by the serving cells to provide the wireless connectivity to the UE.

14. The method of claim 13, wherein determining the weight factors comprises assigning higher weight factors to serving cells having higher frequencies to steer the data towards the serving cells having the higher frequencies and assigning lower weight factors to serving cells having lower frequencies to steer the data away from the serving cells having the lower frequencies.

15. The method of claim 12, further comprising:
    determining the weight factors based on at least one of spectrum utilization of the serving cells, loading of the serving cells, bandwidth supported by the serving cells, and capabilities of the UE.

16. The method of claim 12, further comprising:
    scheduling transmission of data from the serving cells towards the UE using schedulers, wherein transmission of data from each of the serving cells is scheduled using a different one of the schedulers.

17. The method of claim 16, further comprising:
    providing the weights associated with the serving cells to the schedulers, and wherein the schedulers schedule transmission of the data from the serving cells based on the weights.

18. The method of claim 12, further comprising:
    modifying at least one of the weight factors and the weights while maintaining the total weight assigned to the UE to maintain scheduling fairness of the UE relative to other UEs in carrier aggregation or not in carrier aggregation.

19. The method of claim 18, wherein modifying the at least one of the weight factors and the weights comprises modifying the at least one of the weight factors and the weights in response to at least one of the weights falling below a minimum value.

20. A non-transitory computer readable storage medium, comprising instructions that, when executed by one or more processors, manipulate the one or more processors to:
    access weight factors for serving cells that are aggregated to provide wireless connectivity to a user equipment (UE), wherein the weight factors are determined based on characteristics of the serving cells;
    determine, based on the weight factors and a total weight assigned to the UE, weights for transmitting data to the UE via the serving cells; and
    transmit data to the UE via the serving cells at priorities that are determined based on the weights for the serving cells.

* * * * *